United States Patent [19]

Fuller, Jr. et al.

[11] Patent Number: 4,933,074
[45] Date of Patent: Jun. 12, 1990

[54] ARTICLE SINGULATING SYSTEM AND METHOD

[75] Inventors: Robert L. Fuller, Jr., Issaquah; Mark C. Maier, Renton, both of Wash.

[73] Assignee: The Boeing Company, Seattle, Wash.

[21] Appl. No.: 270,130

[22] Filed: Nov. 10, 1988

[51] Int. Cl.$^5$ .......................... B07C 5/02; B07C 5/04
[52] U.S. Cl. ................................. 209/540; 198/774.1; 198/774.4; 209/542; 209/677; 209/933; 222/485
[58] Field of Search ............... 209/539, 540, 542, 544, 209/558, 675, 676, 677, 679, 911, 914, 920, 548, 933, 557; 198/443, 741, 774; 222/485

[56] References Cited

U.S. PATENT DOCUMENTS

| | | | |
|---|---|---|---|
| Re. 276,907 | 7/1973 | Roinestad et al. | 198/193 |
| 719,751 | 2/1903 | Condon | 104/25 |
| 1,056,369 | 3/1913 | Ritchie | 209/676 |
| 1,090,948 | 3/1914 | Sklovsky et al. | 104/91 |
| 1,139,027 | 5/1915 | George | 198/774 |
| 1,367,199 | 2/1921 | Miller | 209/605 |
| 1,466,029 | 8/1923 | Peters | 198/774 |
| 1,846,327 | 2/1932 | Gray | 209/626 |
| 2,186,652 | 1/1940 | Orth et al. | 209/642 |
| 2,464,449 | 3/1949 | Johnson | 209/625 |
| 2,670,103 | 2/1954 | Mers et al. | 222/485 X |
| 2,714,832 | 8/1955 | Seed et al. | 209/675 X |
| 2,728,445 | 12/1955 | Pike, Jr. et al. | 198/443 X |
| 2,794,551 | 6/1957 | Colling et al. | 209/676 |
| 2,873,854 | 2/1959 | Dapp et al. | 209/550 |
| 2,895,064 | 7/1959 | Hoff et al. | 310/29 |
| 2,982,405 | 5/1961 | Fitz Gerald | 209/626 |
| 2,982,406 | 5/1961 | Fitz Gerald | 209/626 |
| 2,984,350 | 5/1961 | Fitz Gerald | 209/626 |
| 2,997,158 | 8/1961 | Moskowitz et al. | 198/220 |
| 3,052,999 | 9/1962 | Sedgwick et al. | 40/2.2 |
| 3,182,965 | 5/1974 | Kurata et al. | 209/518 |
| 3,197,027 | 7/1965 | Sargrove | 209/538 |
| 3,225,898 | 12/1965 | Roinestad | 198/181 |
| 3,225,902 | 12/1965 | Roinestad | 198/202 |
| 3,231,941 | 2/1966 | Flynn, Jr. | 19/106 |
| 3,261,451 | 7/1966 | Roinestad | 198/193 |
| 3,276,570 | 10/1966 | Hale et al. | 198/193 |
| 3,308,856 | 3/1967 | Ploss | 140/71 |
| 3,333,678 | 8/1967 | Rodman | 198/181 |
| 3,348,659 | 10/1967 | Roinestad | 198/136 |
| 3,366,248 | 1/1968 | Sedgwick et al. | 211/1.5 |

(List continued on next page.)

FOREIGN PATENT DOCUMENTS

| | | | |
|---|---|---|---|
| 2345963 | 4/1974 | Fed. Rep. of Germany | 198/741 |
| 1118222 | 6/1986 | Japan | 209/676 |
| 3080887 | 9/1988 | Japan | 209/920 |
| 2184083 | 6/1987 | United Kingdom | 198/775 |

OTHER PUBLICATIONS

Ashworth Bros., Inc., "An Introduction to Small Radius Ominflex and Small Radius Omni-Grid", Bulletin No. SR80 (Rev. 8/83).

Primary Examiner—Donald T. Hajec
Attorney, Agent, or Firm—Delbert J. Barnard

[57] ABSTRACT

Elongated articles (16) to be singulated are conveyed in bulk into a conveyor (30) which by a shaking motion conveys the articles (16). The bed (80) of the conveyor (30) includes longitudinal channels (100) causing the articles (16) to be aligned lengthwise in the direction of article movement. The conveyor (30) delivers the aligned articles (16) into an alignment receptacle (34) which places a measured amount of the aligned articles (16) into valley regions of a singulator (26). The singulator (36) is composed of alternate and intermediate slat members (108,110), presenting upwardly directed peaks and valleys which are initially in alignment. The alternative slat members (108) are fixesd in position. The intermediate slat members (110) are movable lengthwise relative to the fixed slat members (108). The intermediate slat members (110) are retracted and then extended repeatedly and this motion separates the articles (116) and further advances them to the discharge end of the singulator (36). The singulated articles (16) are delivered onto the upper run of a belt conveyor which carries them, in a spaced apart manner, forwardly for additional processing.

23 Claims, 13 Drawing Sheets

U.S. PATENT DOCUMENTS

| | | | |
|---|---|---|---|
| 3,439,795 | 4/1969 | Roinestad et al. | 198/193 |
| 3,467,239 | 9/1969 | Roinestad | 198/195 |
| 3,528,136 | 9/1970 | Bechtel, Jr. et al. | 19/102 |
| 3,586,167 | 6/1971 | Lehner | 209/933 X |
| 3,612,269 | 10/1971 | Anderson | 209/921 X |
| 3,682,295 | 8/1972 | Roinestad | 198/203 |
| 3,716,128 | 2/1973 | Edge et al. | 198/38 |
| 3,737,953 | 6/1973 | Bechtel, Jr. | 19/113 |
| 3,793,677 | 2/1974 | Bechtel, Jr. | 19/113 |
| 3,794,155 | 2/1974 | Bechtel, Jr. | 198/194 |
| 3,920,117 | 11/1975 | Roinestad | 198/194 |
| 4,074,392 | 2/1978 | Bechtel, Jr. | 19/113 |
| 4,075,087 | 2/1978 | Gerrans | 209/674 |
| 4,078,655 | 3/1978 | Roinestad | 198/848 |
| 4,106,628 | 8/1978 | Warkentin et al. | 209/556 |
| 4,171,051 | 10/1979 | Wullenwaber | 209/542 |
| 4,249,661 | 2/1981 | Lem | 209/564 |
| 4,260,506 | 9/1981 | Roinestad | D12/60 |
| 4,383,604 | 5/1983 | Grandemange | 198/775 |
| 4,393,901 | 7/1983 | Roinestad | 198/850 |
| 4,398,318 | 8/1983 | Ashworth, III | 19/114 |
| 4,585,114 | 4/1986 | Liliano | 198/774 X |
| 4,685,557 | 8/1987 | Roinestad | 198/834 |
| 4,869,813 | 9/1989 | Bailey et al. | 209/564 X |

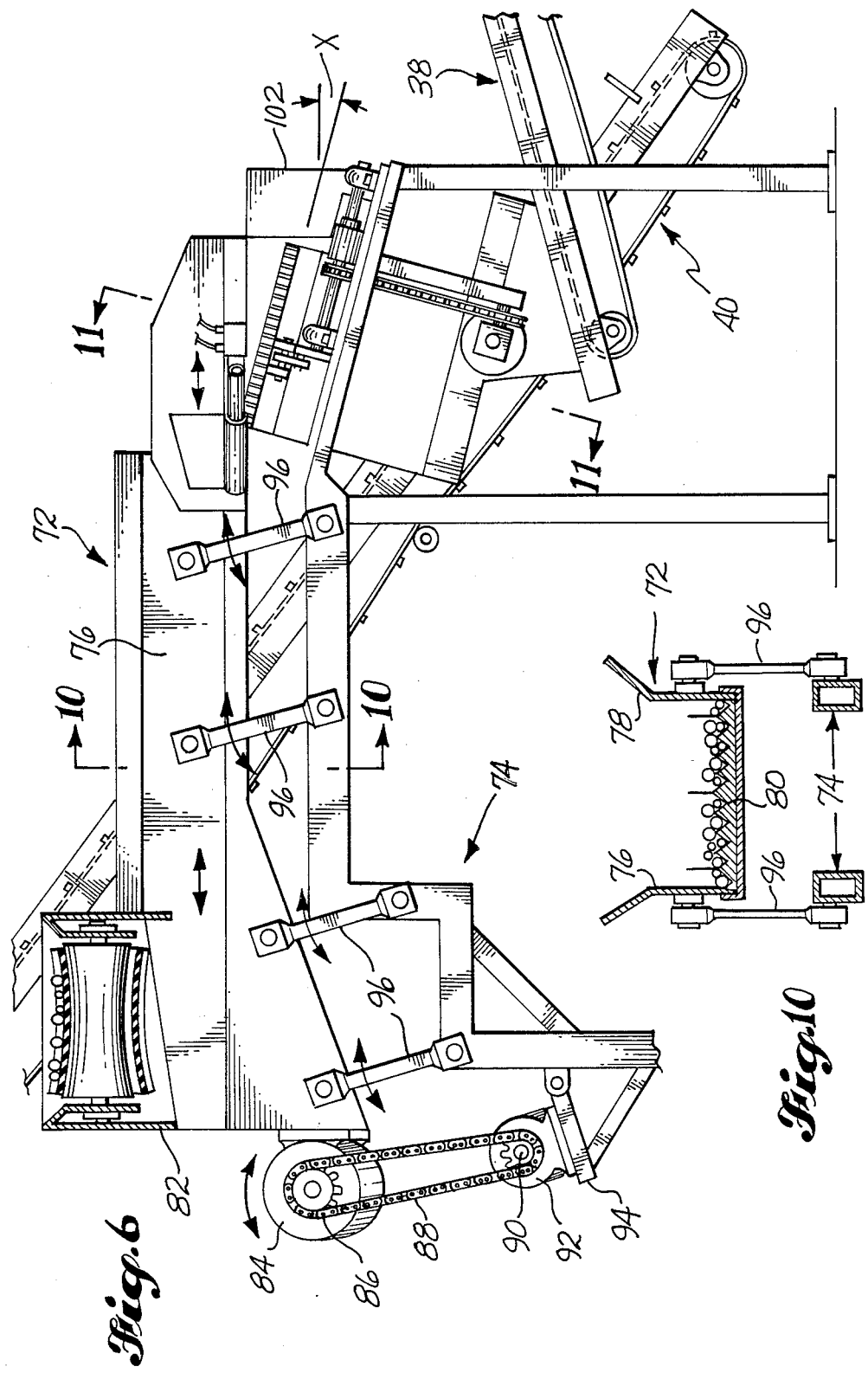

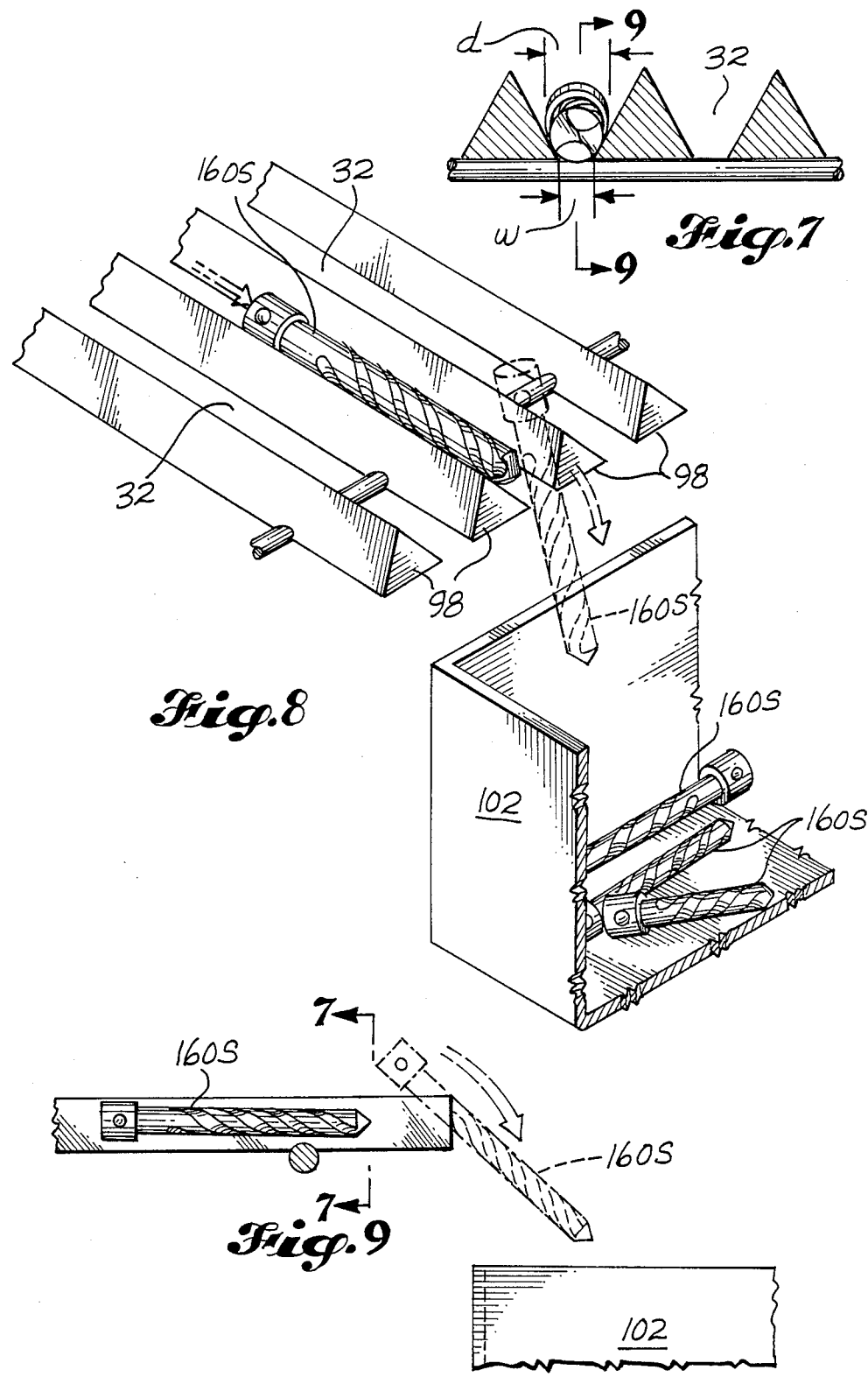

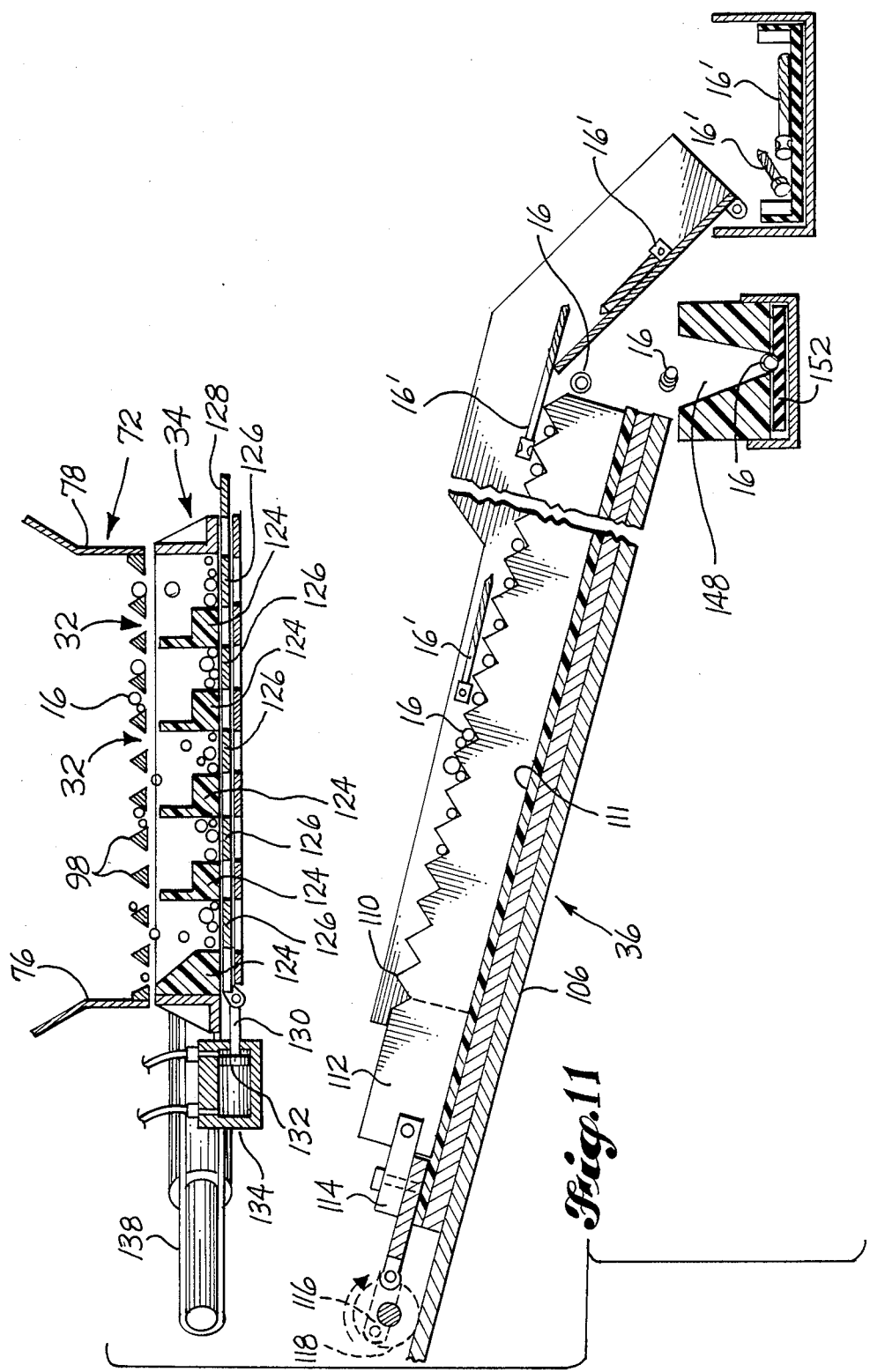

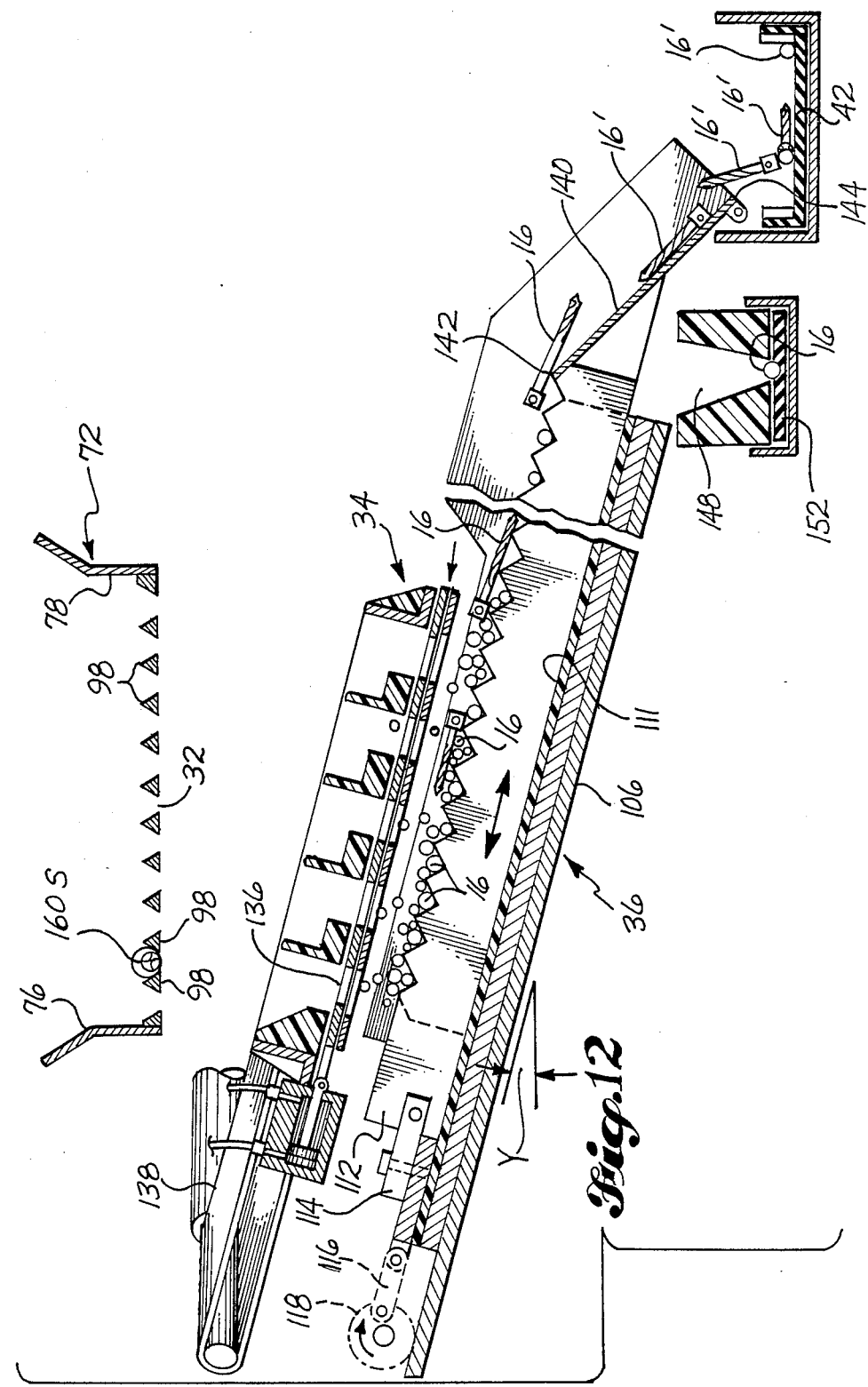

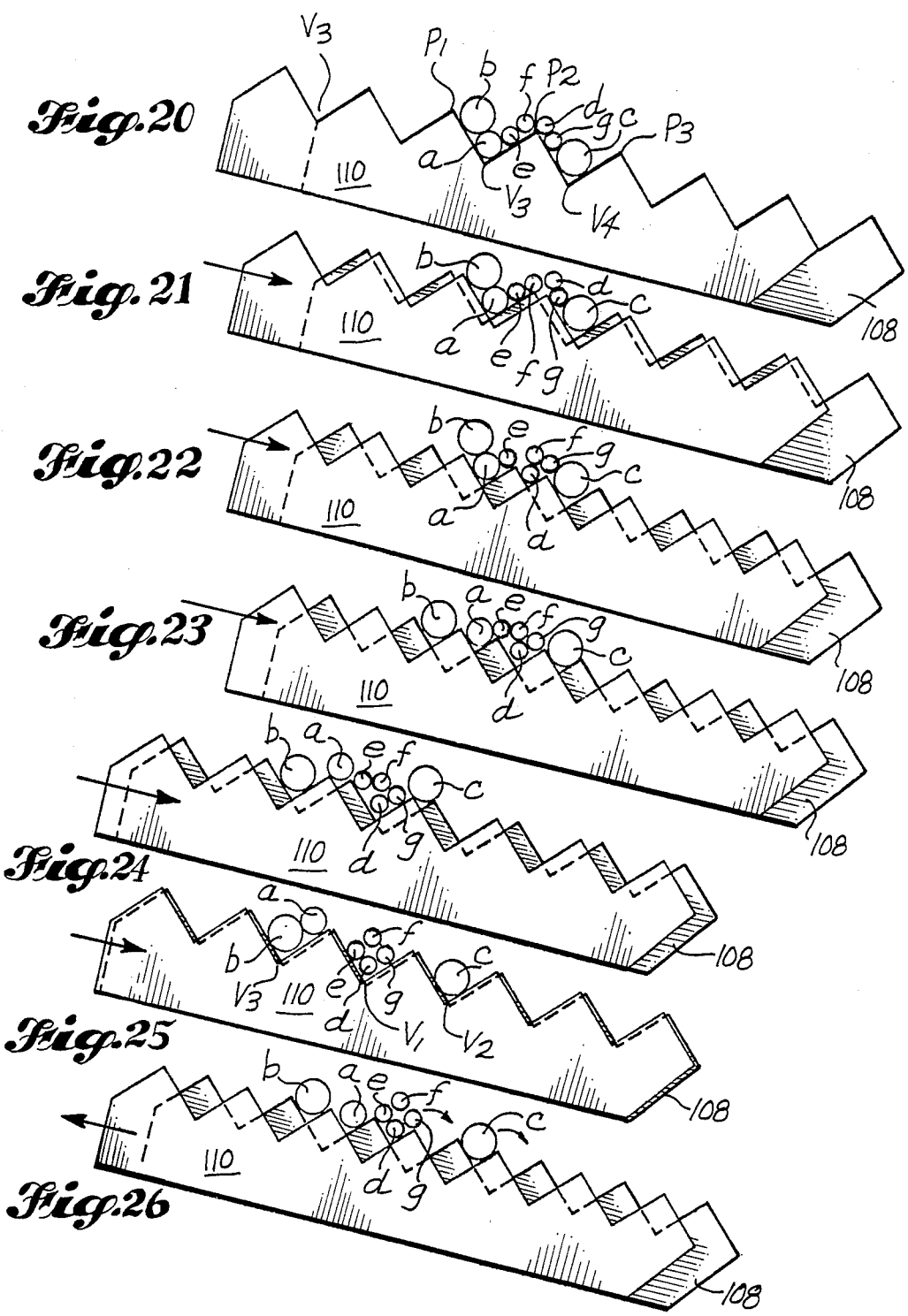

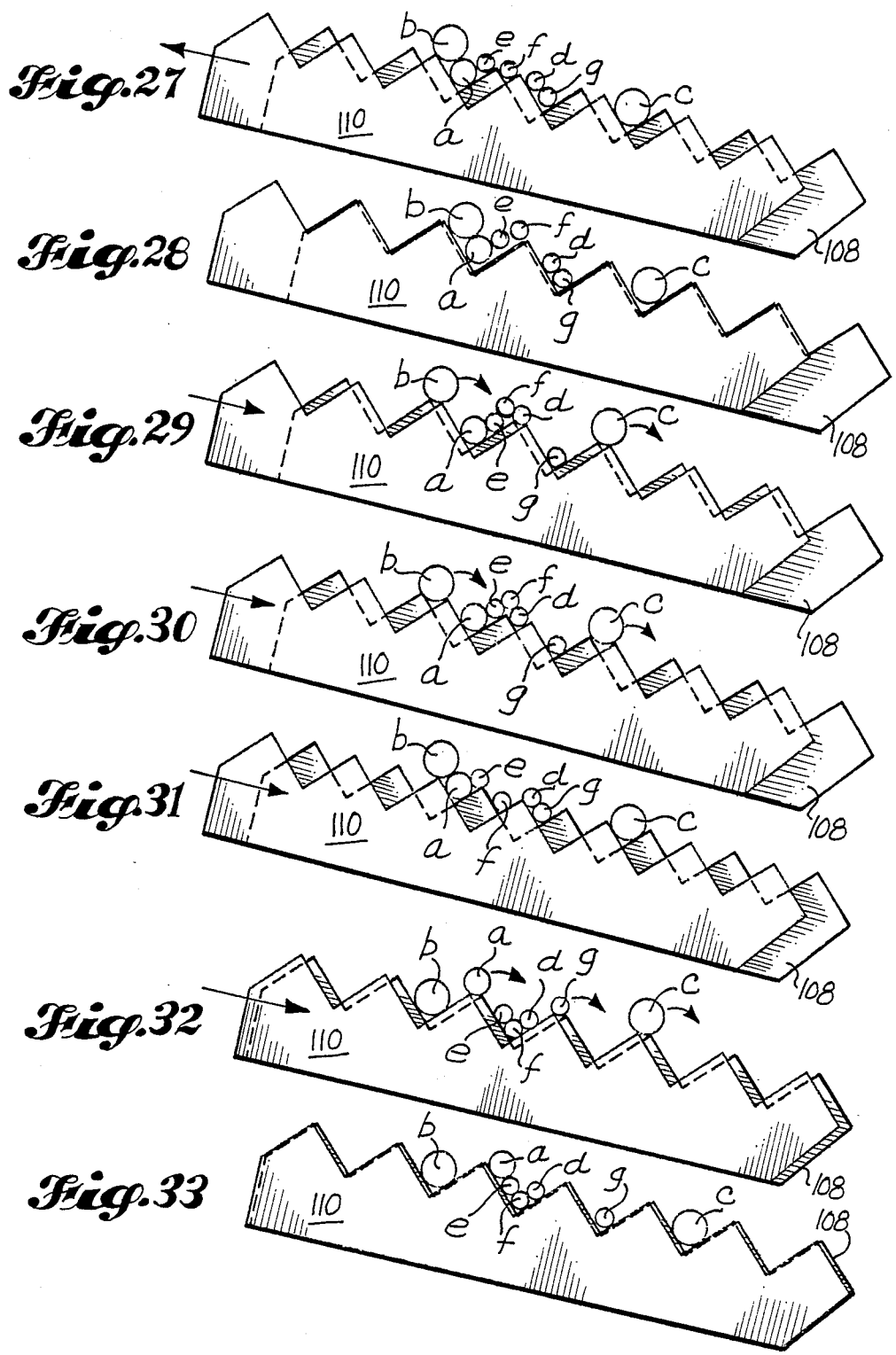

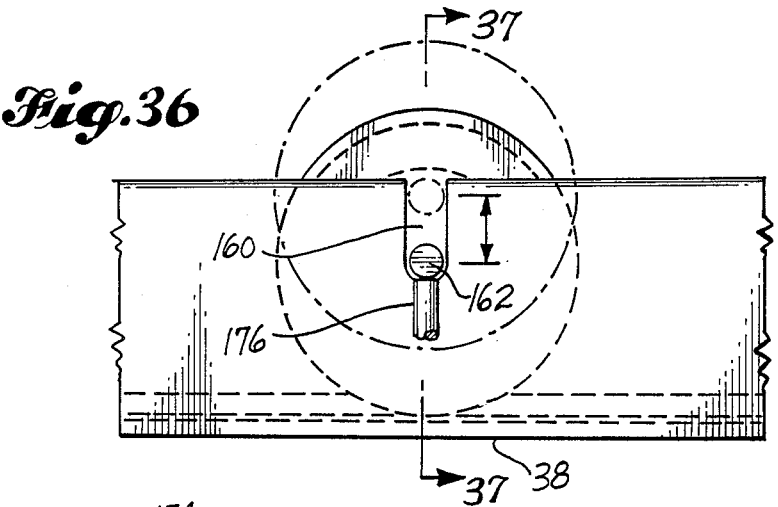
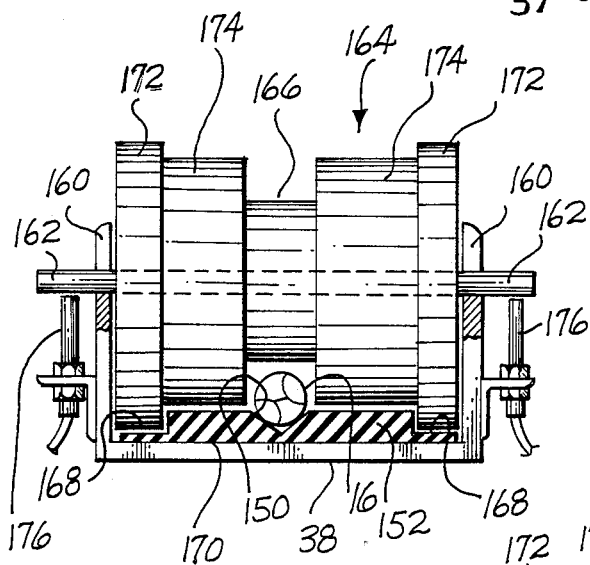
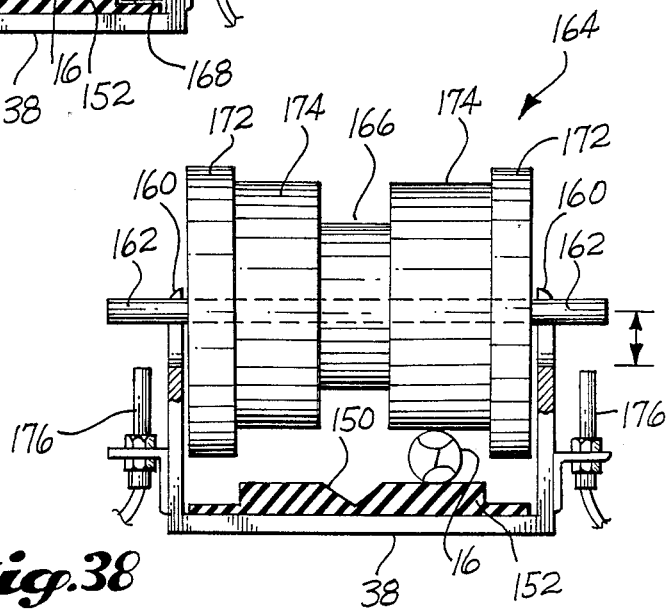

ARTICLE SINGULATING SYSTEM AND METHOD

TECHNICAL FIELD

This invention relates to automated handling of elongated articles (e.g. drill bits). More particularly, it relates to a method and apparatus for separating such articles from an initial entangled mass, and then moving the articles onto a conveyor, one at a time, in spaced apart single file (hereinafter "singulating" the articles).

BACKGROUND OF THE INVENTION

Many manufacturing operations (e.g. the manufacture of aircraft) require the drilling of a large number of holes in varying sizes. Drill bits are used until they become dull and then they are resharpened. In a typical aircraft manufacturing plant, it is necessary to resharpen an extremely large number of drills each week. By way of example, approximately fifty thousand used drill bits are resharpened each week by The Boeing Company in a facility in Auburn, Wash.

The used drill bits are cleaned and sorted before being resharpened. In the past, the sorting operation has been a manual process requiring a number of people (e.g. eight) to perform rough sorting and final sorting activities. In the manual process, cleaned drill bits are deposited onto a conveyor which moves them past two or three people who manually remove the drill bits from the conveyor and separate them into rough sort categories (e.g. 20–25 categories). The drill bits are then hand carried to final sort areas where additional personnel (e.g. five to six people) manually identify and place the drill bits into species bits. In the aforementioned Auburn facility of The Boeing Company, the drill bits to be sorted comprise over six hundred types. A principal object of the present invention is to provide a method and apparatus for separating entangled drill bits or like articles and moving them onto a conveyor in single file, for subsequent handling. The present invention was developed as a part of an automated drill bit sorting system which will replace the manual sorting operation presently in use. However, it is believed that the method and apparatus of this invention has utility in other systems as well, involving the handling of drill bits, or other types of elongated articles, and either manual sorting, or automatic sorting by a different system, or some other type of subsequent handling of the articles.

RELATED APPLICATIONS

For some articles, a uniform end-to-end orientation of the articles on a conveyor is important. By way of example, it is advantageous that drill bits to be sorted be moved through the sorting system with a common end (e.g. the shank end) leading. In such case, it is necessary to correct the end-to-end orientation of the singulated articles which are not properly oriented when they are placed on the conveyor. Such orientation may be accomplished by use of an orientation system which forms the subject matter of a copending companion application Ser. No. 07/270,251, filed Nov. 10, 1988, and entitled "Article Orientation System And Method".

Following orientation, the articles to be sorted may be moved past an article identification device, e.g. an optical micrometer, which identifies the articles as to type or species and produces an identification signal that is used for automatically placing the articles into receiving bins or receptacles. This sorting can be accomplished by use of a method and system of a type forming the subject matter of a second co-pending companion application Ser. No. 07/270,221, filed Nov. 10, 1988, and entitled "Article Sorting Apparatus and Method."

It is desirable that the receiving bins or receptacles into which the sorted articles are placed be located close together in an area involving a relatively small amount of floor space. This can be accomplished by positioning the receiving bins side-by-side along a helical path. A receiving bin system of this type forms the subject matter of a third copending companion application Ser. No. 07/269,991, filed Nov. 10, 1988, and entitled "Storage Mechanism For Sorted Articles."

An overall system for handling and sorting drill bits forms the subject matter of a fourth copending application Ser. No. 07/270,129, filed Nov. 10, 1988, and entitled Automated Drill Sorting System and Method.

DISCLOSURE OF THE INVENTION

In accordance with a method aspect of the invention, elongated articles are conveyed in bulk in a random orientation. These articles are delivered into an alignment receptacle having a bottom which includes a plurality of elongated, parallel, alignment channels into which the articles will be received. Articles received in the alignment channels are moved lengthwise of the channels into slot openings which are in endwise alignment with the channels. Articles received in the slot openings pass vertically downwardly through the slot openings. Below the slot openings at least some of the articles are in a parallel adjustment with each other. These parallel articles are moved laterally and in the process each is separated from the others. The lateral movement of each separated article is then continued. Each separated article is delivered onto a conveyor which moves longitudinally of the article. Each article is delivered onto the conveyor in a spaced position relative to the article preceding it on the conveyor.

According to a method aspect of the invention, the elongated articles are received and are initially conveyed as an entangled mass which, for example, may be one to four inches high. In this condition, the articles are deposited onto a vibrating conveyor which functions to vibrate them while continuing to convey them, to in this manner at least partially untangle the articles and spread them out. In a preferred method, the entangled articles are initially conveyed by use of an endless conveyor having a discharge end positioned over a pan portion of a vibrating conveyor and such pan portion is elongated in a direction which is substantially perpendicular to the endless conveyor. The discharge end of the pan portion is positioned to discharge onto a second endless conveyor which extends substantially longitudinally of the pan portion of the vibrating conveyor.

In the preferred system, the second endless conveyor moves the articles through a demagnetizing coil which discharges onto a third conveyor. The third conveyor is positioned perpendicular to the second conveyor and uses a shaking motion to convey the articles. The bed of the third conveyor is formed to cause the articles to be aligned lengthwise in the direction of the articles' movement. This alignment conveyor delivers the articles into an alignment receptacle.

Preferably, the alignment receptacle is attached to the discharge end of the alignment conveyor, and consists of a plurality of slots and channels. The slot openings act to remove oversized articles, and the channels act to contain properly sized articles.

An article having a transverse dimension larger than the width of a slot opening cannot pass through the slot opening. Such article is moved endwise of the structure which defines the slot opening, to a collection station positioned endwise of the structure. A sensor is placed in the body of the receptacle which defines the channels. The sensor is used to measure the amount of articles being collected by the channels so as not to overfill the alignment receptacle.

The alignment receptacle functions to place a measured amount of pre-aligned articles into the valleys of the singulator bed. This is done when the multi-door gate, which comprises the bottom of the channels, opens to expose the articles to the valleys of the singulator bed.

Some of the articles which fall through the channel openings assume an orientation other than a parallel alignment with the singulator bed valleys. These disoriented articles are collected and returned to the shaker conveyor, and eventually the alignment receptacle by means of a return conveyor.

In the preferred method embodiment, the separated articles are delivered onto an endless conveyor of a type comprising a conveyor belt with a longitudinal groove. The separated articles are delivered into the groove. This conveyor is provided with an inspection device which serves to inspect it for articles which might have been delivered onto it, but not into the groove. If such an article is found, a signal is generated. In preferred form, this signal is used to stop movement of the singulated article conveyor.

In preferred form, the alignment receptacle is mounted to be movable. Its bottom includes a plurality of elongated, parallel bars, which are positioned to define slot openings in the bottom which are in endwise alignment with the alignment channels. The receptacle is moved in a manner causing a stepping movement of articles which have been received in the channels, lengthwise of the channels towards the slots. Thus, elongated articles in the channels will be moved into the region of the slots. If they are smaller in cross-sectional dimension than the width of the slots, they will pass through the slots.

In preferred form, a collection tray is located below the slots for receiving articles which have passed through the slots. The collection tray comprises a plurality of parallel collection channels, each of which is normally closed at its bottom by a door. A sensor is mounted in such a manner as to sense the amount of articles lodged in the collection channels. Periodically, the doors are opened for discharging elongated articles from the collection channels. In preferred form, the doors are connected together and are elongated sections of plate material separated by slots. The doors are opened by moving them laterally of the collection channels, to move them out from below the collection channels and move the slots into registry with the collection channels.

According to an aspect of the invention, a singulator is positioned below the collection tray. The singulator slopes from an upper end to a lower end. The collection tray is mounted for pivotal movement between an upper position in which the collection channels are adjacent the slots, and a lower position in which the collection channels are adjacent the singulator.

In preferred form, the singulator comprises a plurality of side-by-side elongated slat members, each having an upper portion which includes alternating peaks and valleys extending along the length of the slat member and substantially equal in shape and size to the peaks and valleys of the other slat members. Alternative slat members are fixed in position and intermediate slat members are connected to each other for lengthwise movement back and forth relative to the fixed slat members. This movement, together with the sloping attitude of the singulator, causes elongated articles which are delivered into the valleys at the upper end of the singulator, to both move downwardly along the singulator, from valley-to-valley, and each to become separated from the others (i.e. singulated). Except for an occasional occurrence, there is only a single article in each valley at the lower end of the singulator, and the singulator discharges the articles one at a time.

In preferred form, the singulator also slopes sideways and includes a boundary wall at its lower side. The slat members at the lower side may be thinner than the upper slat members. This is because when the peaks of the movable slat members are in the valley regions of the fixed members, slot-like spaces are defined laterally between the peaks. Slot-like spaces are also defined laterally between the fixed slat members. The sideways sloping of the singulator causes articles which have not fallen into the valleys to first slide sideways of the singulator to the boundary wall. When the smallest articles to be handled are against the boundary wall, they are only exposed to relatively narrow spaces. As a result, they will not become wedged in the spaces but rather be allowed to slide lengthwise of the singulator to a return conveyor which receives misaligned articles and returns them to the alignment receptacle.

BRIEF DESCRIPTION OF THE DRAWING

Like reference numerals or letters are used to designate like parts throughout the several views of the drawings, and:

FIG. 6 is a side elevational view of a mechanism which both aligns the articles to be sorted and conveys them onto the next station of the system, and also sorts out oversized articles;

FIG. 7 is an enlarged scale sectional view of the discharge end of the mechanism shown by FIG. 6, taken substantially along line 7—7 of FIG. 9;

FIG. 8 is an isometric view showing an oversized article moving endwise of the bars and slots towards a collection receptacle;

FIG. 9 is a sectional view taken substantially along line 9—9 of FIG. 7;

FIG. 10 is a cross-sectional view taken substantially along line 10—10 of FIG. 6;

FIG. 11 is an enlarged scale sectional view taken substantially along line 11—11 of FIG. 6, and including a sectional view of a singulator which is positioned below the orientator;

FIG. 12 is a view like FIG. 11, but showing the collector lowered and opened, and in the process of depositing articles onto the singulator;

FIGS. 13-33 are enlarged scale, fragmentary, longitudinal sectional views, taken through the singulator, and showing the singulating members in side elevation and the articles being singulated in cross-section;

FIG. 36 is an enlarged scale, fragmentary, side elevational view, with some parts omitted, taken from the aspect of line 36—36 in FIG. 1;

FIG. 37 is a sectional view taken substantially along line 37—37 of FIG. 36, with some parts shown in elevation, such view showing an article in proper position within a V-groove at the center of an endless conveyor belt; and FIG. 38 is a view like FIG. 37, but showing an article in an improper position, and showing the position indicator operating to produce a signal indicating a need for an operator to manually correct the positioning of the article on the conveyor belt.

BEST MODE FOR CARRYING OUT THE INVENTION

The illustrated embodiment is a system for sorting used drill bits prior to their being resharpened. Accordingly, in the following description of the illustrated embodiment, the "articles" to be sorted will be referred to as "drill bits." However, it is to be understood that, with respect to the broader aspects of the invention, the disclosed system, and its use for handling drill bits, merely serves as a typical example of an embodiment and a use of the invention. Drill bits are elongated articles and a system embodying features of the invention could well be constructed and used for orienting and singulating other types of elongated articles, e.g. bolts, screws, nails, sleeves, bushings, tubes, mandrels, etc.

Figure 1:
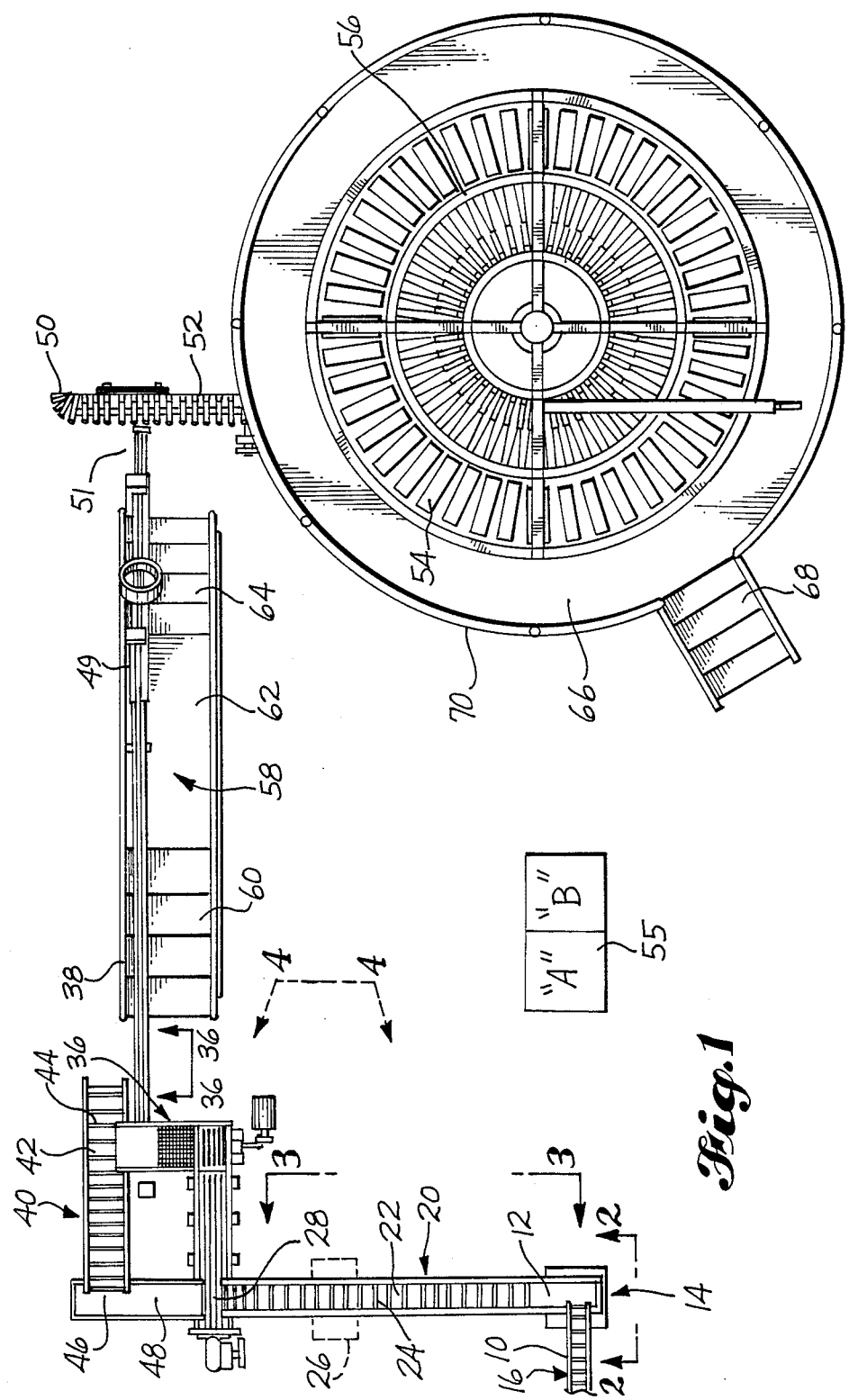
FIG. 1 is a top plan view of an article sorting system embodying the invention, such view serving as a flow diagram and showing an advantageous positioning of the several components of the system relative to each other.
Figure 2:
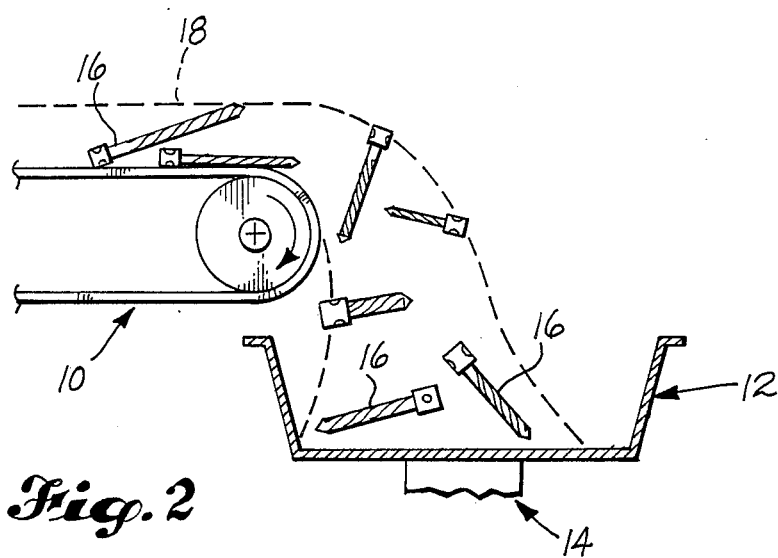
FIG. 2 is an enlarged scale sectional view, diagrammatic in form, taken from the aspect of line 2—2 in FIG. 1.

Referring to FIG. 1, drill bits which need to be resharpened are delivered by an endless belt conveyor 10 into a receiving pan portion 12 of a vibrating conveyor 14. The drill bits 16 are stacked several inches thick on the upper run of the conveyor 10, and they are matted together, i.e. entangled. The upper boundary of the mat of drill bits is designated 18 in FIG. 2. The vibrating conveyor 14 helps shake the drill bits 16 apart. Also, the pan 12 of the vibrating conveyor 14 absorbs the fall of the drill bits 16. The vibrating conveyor 14 moves the drill bit 16 onto the upper run of an endless belt conveyor 20. The belt of conveyor 20 could be damaged (or its wear accelerated) if the drill bits 16 were to be dropped directly onto it by the infeed conveyor 10.

By way of typical and therefore nonlimitive example, the vibrating conveyor 14 may be of a type manufactured by Eriez Manufacturing Co., a corporation of Pennsylvania. Such a conveyor is disclosed in now-expired U.S. Pat. No. 2,997,158, granted Aug. 22, 1961, to Lester R. Moskowitz and Robert R. Peterson.

Figure 3:
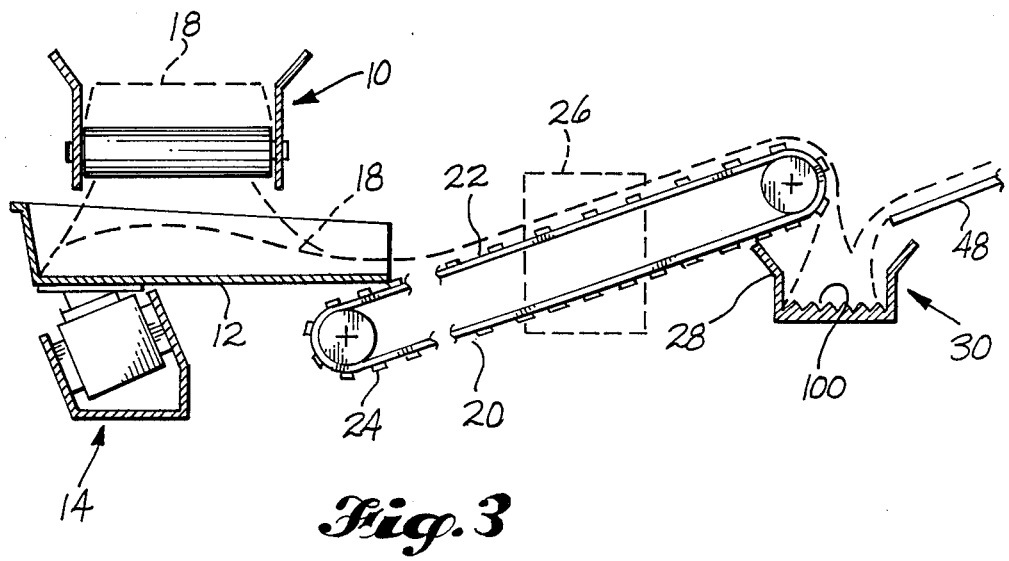
FIG. 3 is a view like FIG. 2, taken substantially from the aspect indicated by line 3—3 in FIG. 1.

Referring to FIG. 3, the drill bit mat 18 is shown to be thinning out as drill bits from it are delivered by the vibrating conveyor pan 12 onto the upper run of endless belt conveyor 20. Endless belt conveyor 20 may comprise a rubber or rubber-like conveyor belt 22, of known construction, of a type including transverse cleats 24 molded into its upper surface.

Conveyor 20 first moves the drill bits through a demagnetizer 26 which is only shown schematically because it is a known item. The demagnetizer is required for efficient working of the singulator. If the drills (ferrous articles) have residual magnetism, they will cling together and not singulate. For example, a suitable demagnetizer 26 is manufactured by Electromatic, a company located in Chicago, Ill.

The drill bits 16, after being moved through the demagnetizer 26, are delivered by conveyor 20 into the hopper portion 28 of an orientator 30. The orientator 30 has two purposes. Firstly, it orients all of the drill bits 16 delivered to it into a position of longitudinal alignment with a set of parallel gauge openings 32 (FIGS. 7 and 8), and moves the drill bits 16 into the gauge openings 32. Secondly, it separates out oversized drill bits 16OS (FIG. 8) and other types of oversized articles which might have been mixed in with the drill bits.

Figure 5:
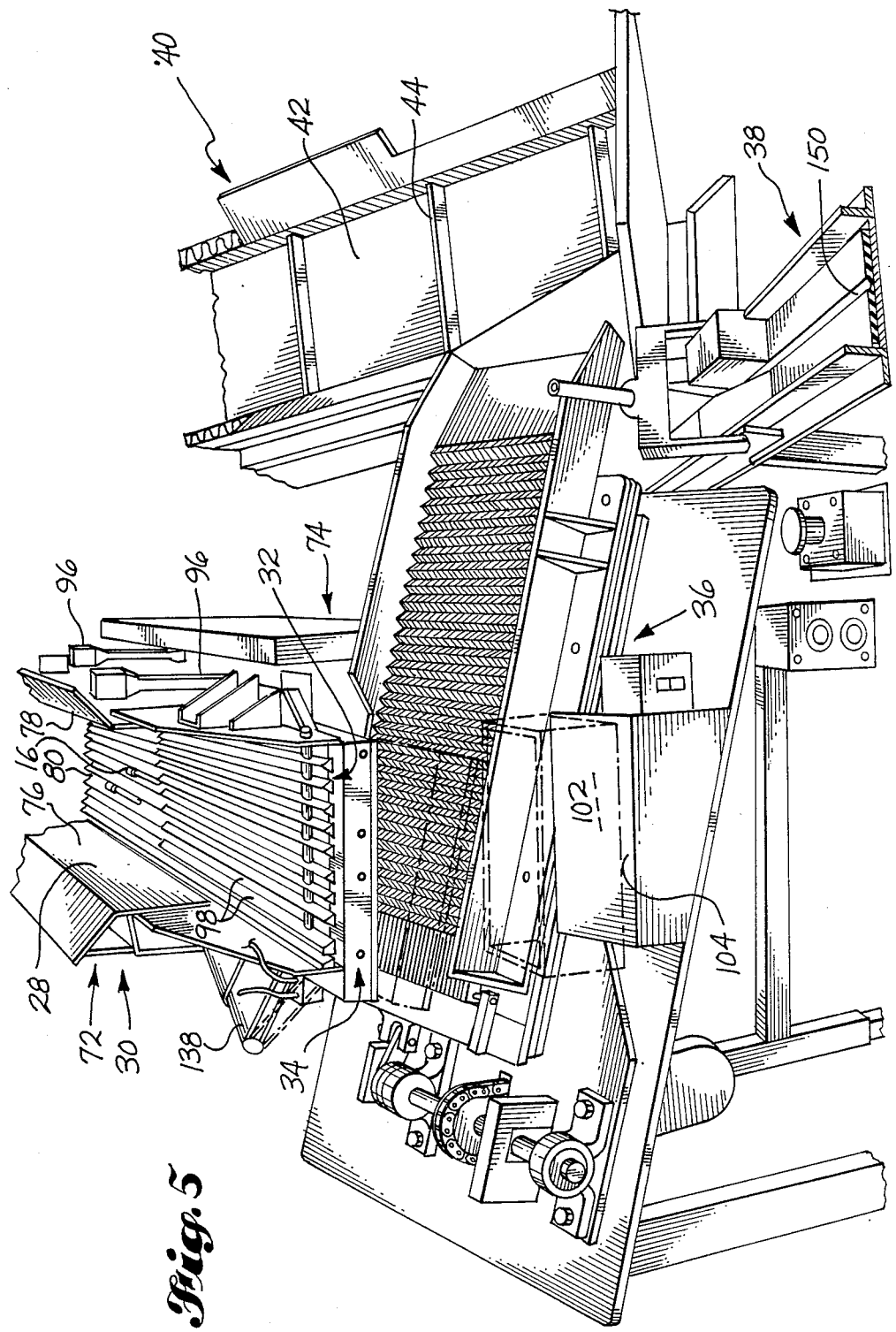
FIG. 5 is a fragmentary pictorial view, on yet a larger scale, taken substantially from the aspect of line 5—5 in FIG. 4.

Referring again to FIG. 1, an advantageous utilization of floor space is to place the infeed conveyor 10 so that it extends perpendicular to both vibrating conveyor 14 and the elevating conveyor 20. The demagnetizer 26 is positioned intermediate the ends of the conveyor 20 and includes a tunnel-like passageway through which the upper run of the conveyor 20 extends. The orientator 30 is positioned to extend perpendicular to conveyor 20. Referring to FIG. 5 and as will hereinafter be described, the orientator 30 feeds the drill bits 16 into a collector 34 which is positioned below the gauge openings 32. The collector 34 is adapted to periodically deposit a collected quantity of the drill bits 16 onto a singulator 36. The singulator 36 is directed substantially perpendicular to the orientator 30. It has two separate discharge paths. The first discharge path leads onto an elevating conveyor 38. The drill bits 16 which are deposited onto the elevating conveyor 38 are the drill bits which have been successfully separated from the rest by the singulator 36. These drill bits 16 are delivered one at a time, in single file, onto the upper run of the elevating conveyor 38. The conveyor 38 extends perpendicular to the longitudinal access of the singulator 36. The second discharge path for drill bits 16 from the singulator 36 is straight off of the second end of the singulator 36. Drill bits 16 which travel this path are drill bits 16 which for some reason or another do not become properly positioned on the singulator 36. The singulator 36 is constructed in a manner which causes these drill bits 16 to slide lengthwise along the singulator 36 and onto the upper run of an elevating conveyor 40. Elevating conveyor 40 preferably has a rubber or rubber-like belt 42 and transverse cleats 44 molded into the belt 42. Conveyor 40 elevates the drill bits 16 which it receives and deposits them into a hopper 46 having a bottom portion 48 sloped so as to deliver the drill bits back into the hopper 28 of the orientator 30. Return conveyor 40 extends substantially perpendicular to the singulator 36. Hopper 46 extends substantially perpendicular to the return conveyor 40.

The portion of the system disclosed in FIG. 1 that is downstream of conveyor 38 is not directly a part of the present invention. The conveyor 38 discharges the drill bits onto a gravity conveyor 49 which may be both a part of an orientation system and an identification system. The gravity conveyor delivers the drill bits 16 onto a loading station 51. At the loading station the drill bits, which at this time have been identified as to species, are individually delivered into carrier tubes 50 which are part of an endless conveyor 52 which delivers each drill bit to an associated receiving receptacle 54. In the illustrated system, the endless conveyor 52 moves the carrier tubes 50 along a helical path which may, by way of example, be seven turns in height. The receiving receptacles 54 are positioned in a helical pattern outwardly adjacent the conveyor path. The system is operated in part by a computer 55. A part "A" of the computer 55 may control the delivery of the drill bits through the identification system. The second unit "B" of the computer 55 may control movement of the conveyor 52 and the transfer of the drill bits 16 from the carrier tubes 50 to the appropriate receiving receptacles 54. Each drill bit is identified as to species immediately before it is deposited into a carrier tube 50. The identification information is used by the computer 55 to effect a transfer of the identified drill bit 16 out from its carrier tube 50 and into its receiving receptacle 54. The identification information, and other information stored in the computer 55, tells the computer 55 how many positions the receiving carrier unit 50 is from the particular receiving receptacle 54 that is to receive the particular drill bit that is in the carrier unit 50. When the carrier unit 50 moves the number of positions required to place it laterally adjacent the proper receiving receptacle 54, the computer 55 activates a mechanism which transfers the drill bit 16 from its carrier unit 50 into its receiving receptacle 54.

As shown in FIG. 1, the framework for the elevating conveyor 38 and the gravity conveyor 49, and the associated identification equipment, may advantageously include a walkway 58. Walkway 58 may comprise steps 60 at one end, an elevated platform 62 in its midsection, and steps 64 at its second end. This arrangement allows operators and maintenance personnel to walk alongside the system, in its extent between the singulator 36 and the loading station 51.

The framework 56 which establishes the helical path of travel for the endless conveyor 52, and supports the collection receptacles 54, and the mechanism used for transferring drill bits from the carrier units 50 to the collection receptacles 54, preferably also defines an elevated walkway 66 which surrounds the receiving receptacles 54. A stairway 68 may be provided for use by operators and maintenance personnel. As shown by FIG. 1, the endless conveyor 52 includes a path that is perpendicular to the gravity conveyor 49, and the other components of the system which are substantially in line with it. The upper run of this path of the endless conveyor 52 enters the helical portion of the path, at the bottom of such helical portion, and then moves upwardly as it traverses the turn of the helical path. At the top of the helical path, it extends at a tangent, substantially in line with the straight path leading into the helical path. It then turns and extends vertically downwardly and then turns again and makes a return run over to the vicinity of the loading station 51. As shown by FIG. 1, this orientation of the endless conveyor 52, and its relationship to the other components of the system, provides a very efficient utilization of floor space. The computer(s) 55, some control consoles (not shown), desk space for the operators, etc. may be conveniently positioned in the space that lies on the side of walkway 58 which is between the conveyor 30 and the collection and holding mechanism 70.

The identification system, and certain elements of the mechanism associated with it for loading drill bits or other articles into the carrier units and delivering them to the proper storage receptacles 54, form the subject matter of the aforementioned copending companion application entitled "Article Sorting Apparatus And Method". The system for providing proper end-to-end orientation of the drill bits forms the subject matter of the aforementioned copending companion application entitled "Article Orientation System And Method". A preferred form of collection and holding mechanism for the drill bits forms the subject matter of the aforementioned copending companion applicaton entitled "Storage Mechanism For Sorted Articles".

Referring now to FIGS. 4–9, the orientator 30 comprises a movable upper portion 72 and a fixed frame lower portion 74. The hopper 28 is a part of the upper portion 72. The hopper 28 is defined by opposite sidewalls 76, 78, and a bottom wall 80. As best shown by FIG. 5, the sidewalls 76, 78 may include upper portions which flair outwardly.

The upper portion 72 also includes an end wall 82 (FIG. 6) on which a rotating weight vibrator 84 is mounted. This mechanism includes a belt pulley 86 and an endless drive belt 88, that extends around belt pulley 86 and about a second belt pulley 90, which is secured to the output shaft of a rotary motor 92. Belt pulley 86 is secured to a shaft which is in turn secured to one or more weights which are eccentrically mounted on the shaft. As the shaft rotates, the rotating eccentric weights impose forces onto the shaft which are transferred by the shaft through bearings to a housing, and from a housing to the end wall 82. These forces cause the upper portion of the orientator 30 to move back and forth. The drive motor 92 is fixed in position on a support pedestal 94 which is secured to the frame 74. Pulley 86 is movable with the vibrator unit 84. The drive belt 88 permits the movement of pulley 86 relative to pulley 90.

As shown by FIG. 6, a plurality of swing arms or links 96 are interconnected between the orientator sidewalls 76, 78 and the fixed frame 74. The upper ends of the links 96 are pivotally connected to the sidewalls 76, 78. The lower ends of the links 96 are pivotally connected to the frame 74. The links 96 support the orientator upper portion 72 on the frame 74 while at the same time allowing it to move in a controlled manner relative to the frame 74.

As shown by FIG. 5, the bottom wall 80 is constructed to present a plurality of parallel channels which extend longitudinally of the bottom wall 80. As the upper portion 72 moves, the drill bits 16 within the hopper 28 are thrown forwardly and as they move they are contacted by the channel walls and fixed pins, which influence them to move into the channels. As it moves, the hopper 30 continues to impart motion to the drill bits 16 which are in the channels, and moves them lengthwise of the channels towards the gauge openings.

Figure 4:
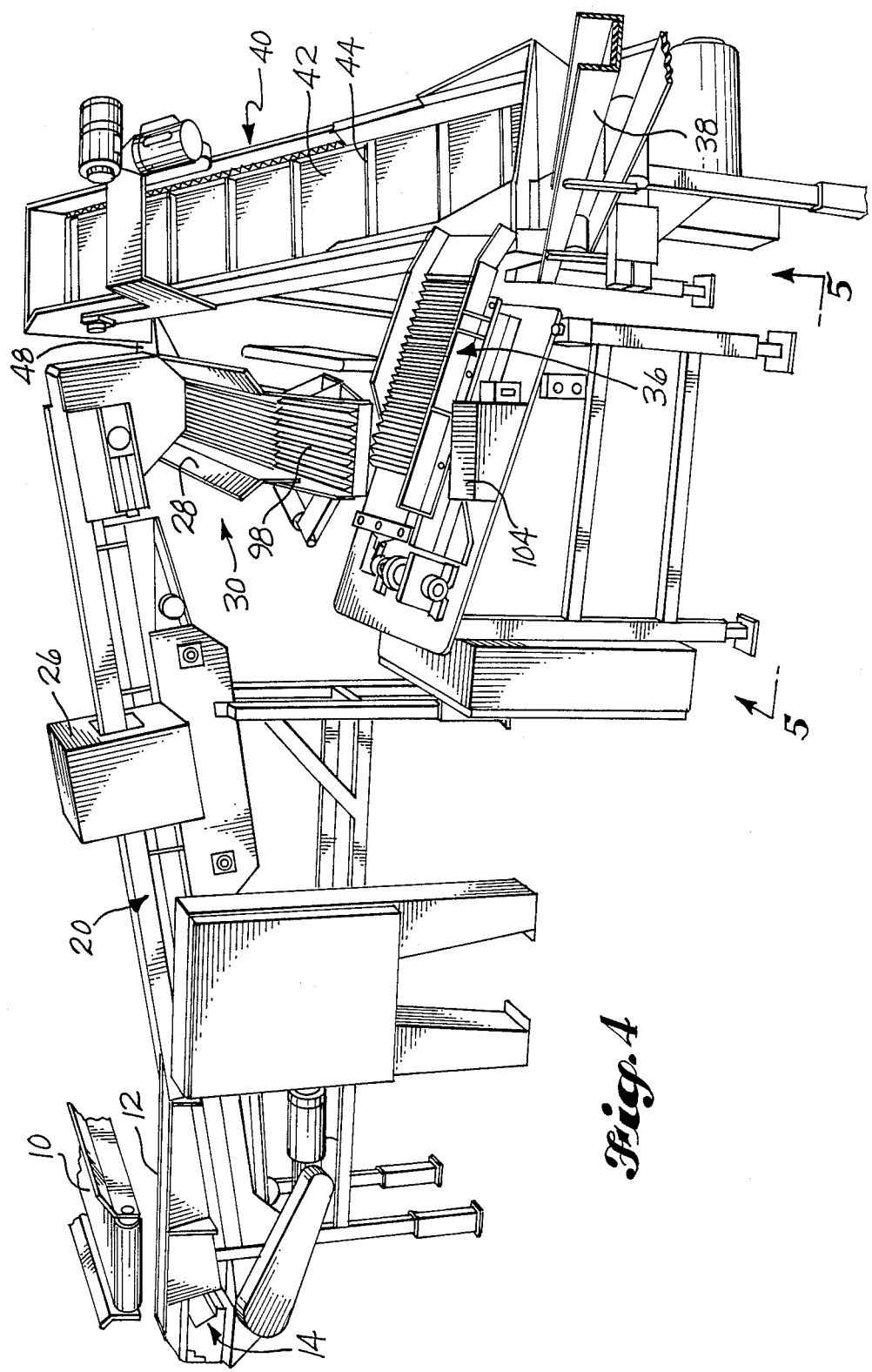
FIG. 4 is an enlarged scale pictorial view of a portion of the system, taken substantially from the aspect of line 4—4 in FIG. 1.

The channels 100 (FIGS. 3 and 5) may be formed by and between a plurality of parallel bars 98 which are secured to the bottom wall 80. Throughout a major portion of the hopper 30, the bars 98 are secured to the bottom wall 80 so that the bottom wall 80 forms a closure for the spaces between the bars 98. At the discharge end of the hopper 30, the bottom wall 80 is replaced by the collector 34. The bars 98 extend along in a straight path, but the regions between the bars are now open at their bottom. The spaces between the bars are the aforementioned gauge openings 32 (FIG. 11). Any drill bit 16 or other article that is below a predetermined maximum diameter or transverse dimension, passes through the gauge openings 32 into the collector 34. Any oversized drill bit 160S (FIGS. 7-9 and 12) or other article remains supported on a pair of the bars 98 and continues to be moved by the movement of the hopper 30, endwise of the hopper 30, and eventually is deposited within a receptacle 102 which is positioned endwise outwardly, and below the outfeed end of the orientator hopper 28. In FIGS. 4 and 5, the support for the receptacle is designated 104. The receptacle 102 has been omitted from FIG. 4 and is shown by phantom lines in FIG. 5, to allow viewing of the upper portion of the singulator 36.

Referring to FIGS. 4, 5 and 11-35, the singulator 36 comprises a base 106 which, in preferred form, slopes both longitudinally and laterally. The lateral or sideways slope is best shown in FIG. 6, by an angle "X" measured between two reference lines, one of which is a horizontal or level line and the other of which is parallel to the plate 106. FIGS. 4, 5, 11 and 12 best show the longitudinal slope of the singulator 36. It is indicated by an angle "Y" (FIG. 12) measured, again, between a horizontal reference line and a second reference line that is parallel to sloping plate 106.

The singulator 36 is quite simple. It comprises a plurality of side-by-side placed, substantially identical, flat bars or slats having sawtooth upper portions, defining alternating peaks and valleys. The slats are divided into two groups. The alternate slats 108 are fixed. The intermediate slate 110 are movable.

As best shown by FIGS. 5 and 11-35, the movable slats 110 have a position in which their peaks and valleys are in alignment with the peaks and valleys of the fixed slats 108. In this condition, the singulator 36 is composed of peaks and valleys which alternate throughout the full length of the singulator 36, and which extend uniformly throughout the full width of the singulator 36.

Upper end portions 112 of the movable slats 110 are connected together and the assembly of movable slate 110 is connected to a plate 114 (FIG. 11). The movable plate 14 contains provisions for making fine adjustments to the position of the movable slats 110 aligning them accurately with the fixed slats 108. Plate 114 is in turn connected by a link 116 to a crank 18. Rotation of crank 18 causes the link 16 to first pull and then push the connector 114 and the movable slats 110 to which it is connected, relative to the fixed slats 108. The stroke of movement is one tooth of the singulator 36. Crank 118 may be rotated by any suitable rotary drive mechanism. The details of construction of this drive, and the details of the support and guide mechanism for the movable slats may vary considerably and per se are not a part of the invention.

FIG. 11 shows the collector 34 in an "up" position. Collector 34 comprises a plurality of separator walls 124 which extend longitudinally of the collector 34, parallel to the bars 98 and the slots 32. Spaces between the walls 124 are aligned with the slots 32. The spaces between the walls 124 are collection channels. These collection channels are normally closed at their bottoms by doors 126. Doors 126 are elongated bar-shaped sections of a plate 128. Plate 128 is guided for sideways reciprocation relative to the collector 34. One end of the plate 128 is connected by a suitable connector structure 130 to a piston 132 that is a part of a double acting air motor 134. The application of pressure to the rod side of the piston 132 causes the piston and the plate 128 to be moved to the left, as pictured in FIG. 12. This moves the doors 126 out of registry with the collection channels and instead moves slots 136 in registry with the collection channels. Slots 136 are formed in the plate 128 between the doors 126. FIG. 11 shows the doors 126 aligned with the collection channels. FIG. 12 shows the slots 36 aligned with the collection channels. As will be apparent, when the rod side of the air cylinder 134 is vented and air pressure is applied to the opposite side, the piston 132 and the plate 128 are moved back into a position placing the doors 126 into registry with the collection channels.

The collector 34 is pivotally mounted at one side of the orientator 30, by a diagonal hinge mechanism 138 which is constructed and arranged to mount the collector 34 for pivotal movement between an up position, in which it is substantially horizontal, and a lowered position in which it substantially matches the two-directional slope of the singulator 36. FIG. 11 shows the collector 34 in its up position, with the collection channels adjacent the slots 32. FIG. 12 shows th collector 34 in its down position, with the collection channels closely adjacent the upper end portion of the singulator 36.

Figure 13:
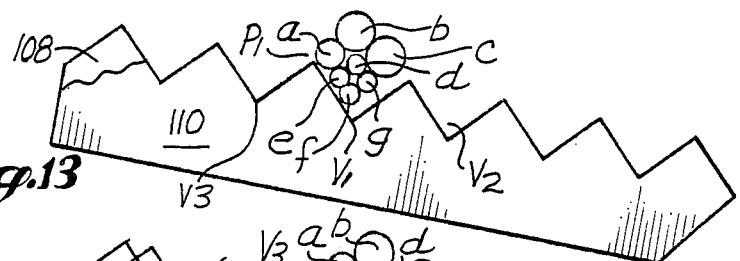
Figure 14:
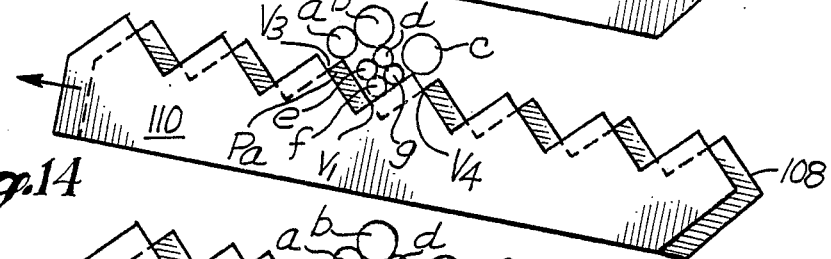

Referring now to FIGS. 13-33, in FIG. 13 a plurality of articles a-g are shown positioned in a single valley region of the singulator 36, at a time when the movable slats 110 are aligned with the fixed slats 108. FIG. 14 shows what happens in response to an initial retraction of the movable slats 110. For the purpose of this explanation, seven articles will be used to describe movement and singulation. Articles a-g initially rest on sloping surfaces between P1, V1 and V1, P2. When slats 110 (FIG. 14) begin to move in the direction shown, valley V1 changes both its volume and its position. At this same time, two new valleys V3 and V4 appear. As surface V1,Pa is shortened, valley V1 is redefined upward and receives a corresponding reduction in its volume.

Figure 15:
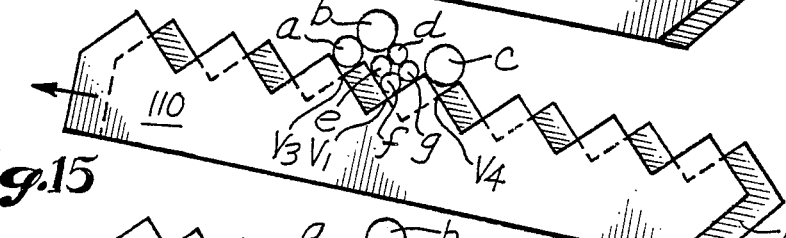
Figure 16:
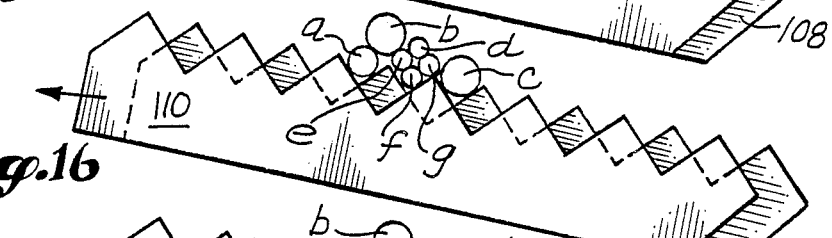
Figure 17:
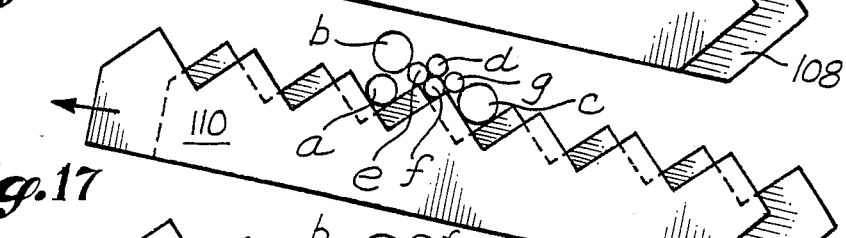
Figure 18:
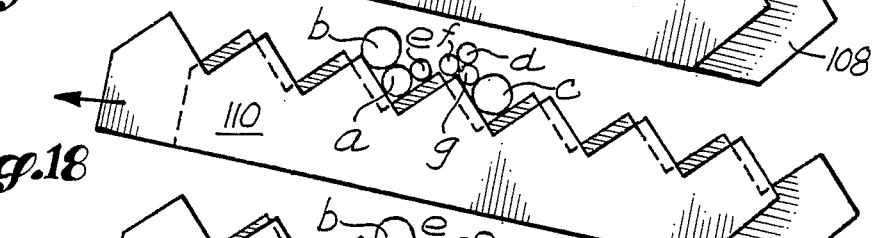
Figure 19:
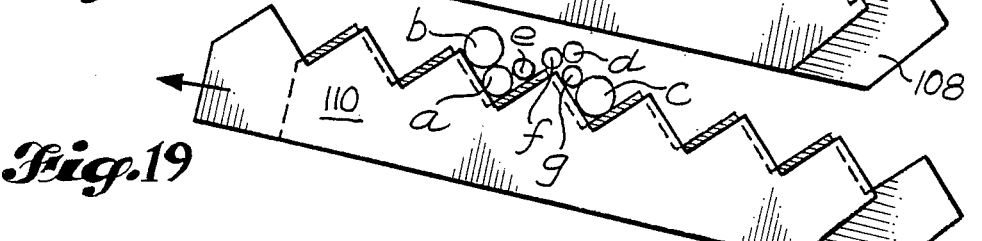

As V1 is moving upward with decreasing volume, valleys V3 and V4 are moving downward and increasing their volumes. FIGS. 14 and 15 show valley V1 growing smaller and forcing articles a,b into valley V3 and article c into valley V4. As the movable slats continue to translate in the direction indicated in FIGS. 15 through 19, the upward definition of valley V1 continues to exert an upward pressure on article f which in turn exerts pressure on articles e and g. When the movable slats have translated a distance of one pitch, valley V1 is temporarily removed and the articles come to rest in the valleys V3 and V4 (FIGS. 19 and 20).

The combined effects of a displacing upward pressure, a reduction in the volume of valley V1, and a corresponding increase in the volumes of valleys V3 and V4, act to separate the bundle of articles originally in valley V1, into two smaller bundles resting in valleys V3 and V4. This action is duplicated over the entire length of the singulator bed, and for both directions of motion of slats 110 (FIGS. 20 through 32).

The continual back and forth motion of slats 110 act to divide and separate until each article occupies one valley (FIG. 33, items b, g, c). At this point, the motion of slats 110 merely act to move the articles from valley to valley until they drop off the end of the singulator one at a time as shown in FIG. 11.

Figure 35:
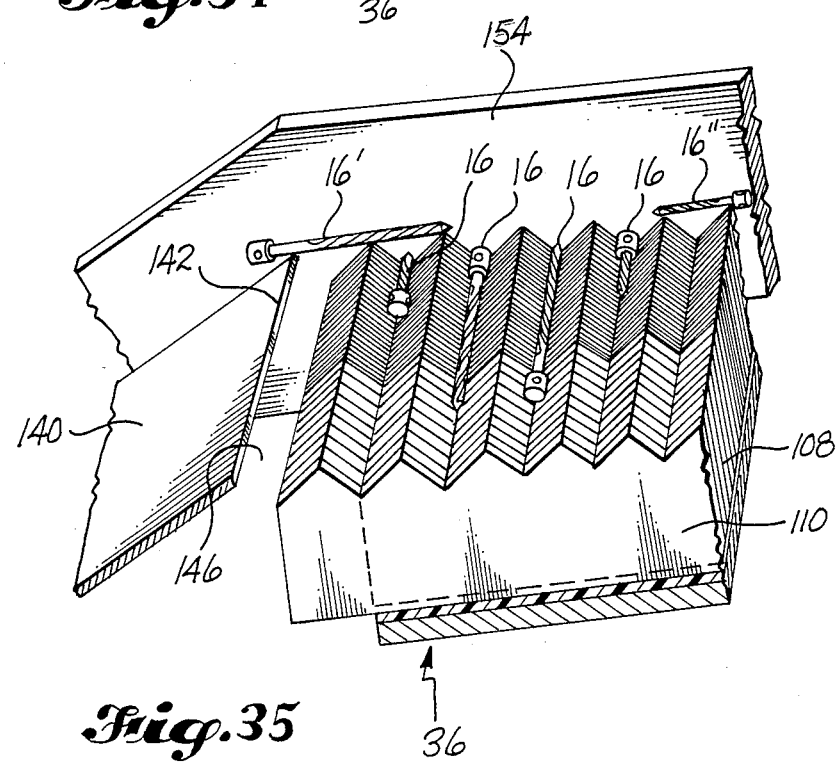
FIG. 35 is a fragmentary isometric view of a lower end, lower side portion of the singulator.

A ramp or apron 140 is located at the lower end of the singulator 36. It slopes downwardly from an upper end 142 to a lower end 144 (FIG. 12). As shown in FIGS. 11 and 35, when the movable slats 110 are extended, a gap 146 is defined between the lower row of peaks and the edge 142. This is because the bottom row of peaks in the fixed slats 108 is spaced from the edge 42. When the movable slats 110 are retracted, they move down into a position contiguous the edge 142. At this time, there is no gap 146 (FIG. 12). If a drill is between the apron and lower edge of the movable slats 110, the drill will become pinched and possible damage to the singulator will occur. To avoid this, the apron is hinged to allow the drill to pass at this point. Afterward, the apron swings back to cover the opening (FIG. 11).

Articles 16 which have aligned themselves with the valleys, and have been moved down the singulator 36, valley-to-valley, drop one at a time, through the slot 146, when the movable slats 110 are retracted (FIG. 11). As shown in FIG. 11, the articles 16 drop one at a time into a hopper 148, having vertically downwardly converging sidewalls. The article 16 drops into, or is guided by the sidewalls into, a center groove 150 formed in the upper run of a conveyor belt 152. Conveyor belt 152 is a part of the elevating endless conveyor 38 which has been described above in connection with FIG. 1. The articles 16 are deposited onto the belt, and into the groove 150, one at a time, and each spaced in position from the article 16 ahead of it.

FIGS. 11, 12 and 35 show what happens to an article 16' which becomes aligned crosswise with the peaks and valleys. It slides down the peaks, over edge 142, and down ramp 140 into a collector region for the return conveyor 40. The articles 16' fall onto the upper run 42 of the return conveyor 40.

Figure 34:
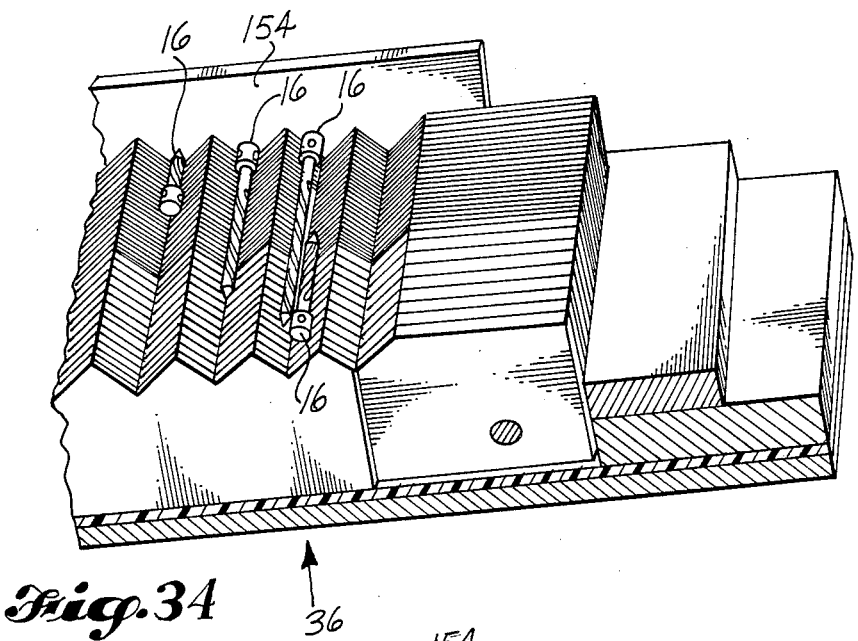
FIG. 34 is a fragmentary isometric view of an upper end, lower side portion of the singulator.

As previously described, the singulator 36 slopes sideways as well as lengthwise. This is done for two purposes. First, tilting the singulator provides a lower sidewall 154 against which misaligned articles 16 may slide and be eventually removed from the singulator. Secondly, the inclined valleys formed by the tilted singulator force articles that may be oriented lengthwise end to end, to slide under one another for better singulation reducing the chance of releasing two drills at once from the singulator. The slidewall 154 is shown at the top of both FIGS. 34 and 35. The valleys are shown in FIG. 34. It is to be understood that these views are looking on the singulator and the wall 154 at a lower side of the singulator 36. FIG. 35 shows a small diameter article 16' down against the sidewall 154, in the process of sliding down the peaks of the singulator 38 towards the ramp 140. Preferably, the fixed and movable slats 108, 110, on the lower side of the singulator 36, are made thinner than the smallest diameter article that will be handled by the singulator 36. The reason for this is that, as mentioned above, when the movable slats 110 are extended, they project downwardly beyond the last row of fixed peaks. This means that spaces exist laterally between the lower row of peaks on the movable slats 110. It is important that these spaces be narrower than the narrowest article that is to be handled, so that small diameter articles will not become jammed in these spaces. The slats in the central and upper portions of the singulator 36 can be made thicker, as the narrow articles 16' that could cause problems will first slide sideways of the singulator 36, to a position against the sidewall 154, before sliding downwardly to the lower end region of the singulator 36, where the spaces are formed.

Occasionally, an article 16 may move out from the center groove 150 in the conveyor belt 52, during the ascent of the belt 52 up conveyor 38. This can cause a problem at the upper end of the conveyor, where the article 16 is transferred onto a gravity conveyor which leads down to the loading station 51. Detection of this condition is important. According to an aspect of the invention, this detection is handled quite simply. As shown by FIGS. 36–38, vertical slots 160 are formed across from each other, in upper sidewall portions of the frame for conveyor 38. Live axles 162 at the opposite ends of a roller 164 are journaled for rotation in the slots 160. The roller 164 is shaped to conform to the conveyor belt 152, with a central groove 166 being provided above the groove 150 in the belt 152. In the illustrated example, the side portions 168 of the belt are thinner than the central portion 170. The roller 164 has large diameter end portions 172 which fit down on the side portions 168 of the belt 152. Roller 64 includes reduced diameter portions 174, spaced inwardly from the portions 172, and outwardly from the groove 166. These portions 174 rest on the thickened central portion 170 of the belt 152, in the regions outwardly flanking the groove 150.

Proximity sensors 176 are positioned immediately below the live axles 162. The proximity sensors 176 are in effect switches in a circuit. If an article 16 moves out of the groove 150, either onto the belt portion 170 or onto one of the belt portions 168, it will, upon reaching the roller 164, exert a lifting force on the roller 164, lifting one or both of the live axles 162 upwardly away from a proximity sensor (176). FIG. 38 shows an article 16 positioned on belt 154 to contact a roller portions 174. By way of example, it is shown to lift the entire roller 164, moving the live axles 162 away from the proximity sensors 176. In actual practice, only one end of the roller 164 would be lifted. However, FIG. 38 illustrates the principle of operation of the device. The lifting of the roller 164 moves one or both of the live axles 162 a far enough distance away from the proximity sensor 176, that a signal is generated in the circuit of which the proximity sensor (176) is a part. For example, the circuit could be designed such that if one of the axles 162 is moved upwardly away from its proximity sensor 176, a light will be turned on, a horn will be sounded, the power drive for the conveyor 38, or the entire system will be shut down.

It is to be understood that the embodiment that has been disclosed is presented for illustrative purposes only. The scope of protection is to be determined by the following claims, intereprected in accordance with established rules of patent claims interpretation, including use of the doctrine of equivalents.

What is claimed is:

1. A method of singulating elongated articles, comprising:
    conveying elongated articles in bulk, piled on each other and in a random orientation;
    delivering such articles into an alignment receptacle having a bottom which includes a plurality of elongated, parallel, alignment channels, into which at least some of the articles will be received;
    moving articles which have been received in the alignment channels lengthwise of the channels into slot openings which are in endwise alignment with the channels;

delivering articles vertically downwardly through the slot openings;

below the slot openings receiving at least some articles in parallel alignment with each other;

moving the parallel articles laterally and separating each from the rest;

continuing the lateral movement of each separated article;

delivering each separated article onto a conveyor which moves longitudinally of the article; and delivering each article onto the conveyor in a spaced position relative to the article preceding it on the conveyor.

2. A method according to claim 1, wherein the conveying of elongated articles in bulk comprises initially conveying the articles piled on each other, with random orientation, and in an entangled condition;

then depositing the entangled articles onto a vibrating conveyor, and vibrating them while continuing to convey them, to at least partially untangle the articles.

3. A method according to claim 2, comprising initially conveying the articles by use of an endless conveyor having a discharge end positioned over the vibrating conveyor, the vibrating conveyor having a pan portion which is elongated in a direction substantially perpendicular to the endless conveyor and which has a discharge end.

4. A method according to claim 3, comprising positioning the pan portion of the vibrating conveyor to discharge onto a second endless conveyor which extends substantially longitudinally of the pan portion of the vibrating conveyor.

5. A method according to claim 4, comprising providing a demagnetizing mechanism in tunnel form, and positioning the second endless conveyor to extend through the tunnel, so that magnetized articles on it will be demagnetized.

6. A method according to claim 1, comprising sizing the slot openings to serve as size gauges for the articles, so that articles having a transverse dimension larger than the width of the slot openings cannot fall through the slot openings, and moving such articles which have a transverse dimension larger than the width of the slot openings longitudinally of the slot openings to a collection station.

7. A method according to claim 1, wherein some of the articles which are delivered vertically downwardly through the slot openings assume an orientation other than a parallel alignment with the other articles, and said method further comprises collecting these disoriented articles and returning them to the alignment receptacle.

8. A method according to claim 1, wherein the conveyor onto which the separated articles are delivered is an endless conveyor comprising a conveyor belt with a longitudinal groove and the singulated articles are delivered into the groove.

9. A method according to claim 8, comprising inspecting the separated article conveyor for articles which might have been deposited on it outside of the groove, and generating a signal indicating such condition.

10. A method according to claim 9, comprising using the signal to stop movement of the singulated article conveyor.

11. A mechanism for aligning elongated articles, comprising:

a movable receptacle into which elongated articles to be aligned are received, said receptacle having a bottom which includes a plurality of elongated, parallel alignment channels, and a plurality of elongated, parallel bars, positioned to define slot openings in the bottom which are in endwise alignment with the alignment channels;

means for moving the receptacle in a manner causing a stepping movement of articles which have been received in the channels, lengthwise of the channels towards the slots, so that elongated articles in the channels will be moved into the region of the slots and, if they are smaller in cross-sectional dimension than the width of the slots, they will fall through the slots;

a collection tray below the slots for receiving articles which have fallen through the slots, said collection tray comprising a plurality of parallel collection channels that each extend parallel to the slots, each of which is normally closed at its bottom by a door; and means for periodically opening the doors for discharging elongated articles from the collection channels.

12. A mechanism for aligning elongated articles, comprising:

a movable receptacle into which elongated articles to be aligned are received, said receptacle having a bottom which includes a plurality of elongated, parallel alignment channels, and a plurality of elongated, parallel bars, positioned to define slot openings in the bottom which are in endwise alignment with the alignment channels;

means for moving the receptacle in a manner causing a stepping movement of articles which have been received in the channels, lengthwise of the channels towards the slots, so that elongated articles in the channels will be moved into the region of the slots and, if they are smaller in cross-sectional dimension than the width of the slots, they will fall through the slots;

a collection tray below the slots for receiving articles which have fallen through the slots, said collection tray comprising a plurality of parallel collection channels, each of which is normally closed at its bottom by a door; and means for periodically opening the doors for discharging elongated articles from the collection channels;

wherein the doors are connected together and are elongated sections of plate material separated by slots, and said mechanism includes means for reciprocating the doors laterally of the collection channels, for moving the doors out from below the collection channels and moving the slots into registry with the collection channels, so that the articles in the collection channels will fall through the slots.

13. A mechanism comprising:

a movable receptacle into which elongated articles to be aligned are received, said receptacle having a bottom which includes a plurality of elongated, parallel alignment channels, and a plurality of elongated, parallel bars, positioned to define slot openings in the bottom which are in endwise alignment with the alignment channels;

means for moving the receptacle in a manner causing a stepping movement of articles which have been received in the channels, lengthwise of the channels towards the slots, so that elongated articles in the channels will be moved into the region of the slots and, if they are smaller in cross-sectional dimension than the width of the slots, they will fall through the slots;

a collection tray below the slots for receiving articles which have fallen through the slots, said collection tray comprising a plurality of parallel collection channels, each of which is normally closed at its bottom by a door; and means for periodically opening the doors for discharging elongated articles from the collection channels;

a singulator positioned below the collection tray, said singulator comprising a plurality of side-by-side elongated slat members, each having an upper portion which includes alternating peaks and valleys extending along the length of the member, and the peaks and valleys of all of the slat members being substantially equal in shape and size, with alternate slat members being fixed in position, and with intermediate slat members being connected to each other for lengthwise movement;

drive means for moving the movable intermediate slat members lengthwise back and forth relative to the fixed slat members;

said singulator being positioned with the members in a plane which slopes in the direction of back and forth movement of the movable members, to provide the singulator with an upper and a lower end;

said collection tray being positioned to discharge articles from the collection channel, upon opening of the doors, onto the upper end of the singulator;

whereby elongated articles deposited onto the upper end of the singulator will either fall into the valleys of the slat members or slide along the peaks toward the lower end of the singulator;

means for collecting articles which slide along the peaks toward the lower end of the singulator;

wherein back and forth movement of the movable slat members causes both a downward movement of the articles which have been received in the valleys, and a separation of these articles, each from the others; and means establishing a separate discharge path at the lower end of the singulator, for articles which have moved down the singulator, by the back and forth movement of the movable slat members.

14. A mechanism according to claim 13, comprising means mounting the collection tray for pivotal movement between an up position wherein the collection channels are adjacent the slots, and a down position wherein the doors are adjacent the slat members.

15. A mechanism according to claim 14, wherein the doors are connected together and are elongated sections of plate material separated by slots, and said mechanism includes means for reciprocating the doors laterally of the collection channels, when the collection tray is in a lower position, for moving the doors out from below the collection channels and moving the slots into registry with the collection channels, so that the articles in the collection channels will fall through the slots.

16. A mechanism for aligning elongated articles, comprising:

a movable receptacle into which elongated articles to be aligned are received, said receptacle having a bottom which includes a plurality of elongated, parallel alignment channels, and a plurality of elongated, parallel bars, positioned to define slot openings in the bottom which are in endwise alignment with the alignment channels;

means for moving the receptacle in a manner causing a stepping movement of articles which have been received in the channels, lengthwise of the channels towards the slots, so that elongated articles in the channels will be moved into the region of the slots and, if they are smaller in cross-sectional dimension than the width of the slots, they will fall through the slots;

a collector for oversized articles positioned endwise of the parallel bars, so that articles which are larger in cross-sectional dimension than the width of the slots will be moved along the parallel bars and be delivered into the collector;

wherein the collector is a removable container.

17. A singulator, comprising:

a plurality of side-by-side elongated slat members, each having an upper portion which includes alternating peaks and valleys extending along the length of the slat member, the peaks and valleys of all of the slat members being substantially equal in shape and size, with alternate slat members being fixed in position, and with intermediate slat members being connected to each other for lengthwise movement;

drive means for moving the movable members lengthwise back and forth relative to the fixed slat members;

said singulator being positioned with the slat members in a plane which slopes in the direction of back and forth movement of the movable slat members to provide the singulator with an upper end and a lower end;

whereby elongated articles deposited onto the upper end of the singulator will either fall into the valleys of the slat members whereby the articles are parallel to the peaks or slide along the peaks toward the lower end of the singulator;

means for collecting articles which slide along the peaks toward the lower end of the singulator;

wherein back and forth movement of the movable members causes both a downward movement of the articles which have been received in the valleys, and a separation of these articles, each from the others; and an apron at the lower end of the singulator for guiding articles that slide along the peaks to the collecting means, the apron positioned so that whenever the movable slat members extend no further downwardly than the fixed slat members, a discharge path is established between the apron and the slat members for articles that have moved down the singulator, parallel to the peaks, in response to the back and forth movement of the movable slat members.

18. A singulator according to claim 17, wherein the singulator also slopes transversely of the direction of movement of the movable slat members towards a lower side having a boundary wall.

19. A singulator according to claim 18, wherein the slat members at the lower side of the singulator are of a width smaller than the diameter of the smallest article to be delivered onto the singulator.

20. A singulator according to claim 19, wherein fixed and movable slat members positioned laterally upwardly from the lower side of the singulator are thicker than the fixed and movable slat members at the lower side of the singulator.

21. A singulator, comprising:
a plurality of side-by-side elongated slat members, each having an upper portion which includes alternating peaks and valleys extending along the length of the slat member, the peaks and valleys of all of the slat members being substantially equal in shape and size, with alternate slat members being fixed in position, and with intermediate slat members being connected to each other for lengthwise movement;
drive means for moving the movable members lengthwise back and forth relative to the fixed slat members;
said singulator being positioned with the slat members in a plane which slopes in the direction of back and forth movement of the movable slat members to provide the singulator with an upper end and a lower end;
whereby elongated articles deposited onto the upper end of the singulator will either fall into the valleys of the slat members or slide along the peaks toward the lower end of the singulator;
means for collecting articles which slide along the peaks toward the lower end of the singulator;
wherein back and forth movement of the movable members causes both a downward movement of the articles which have been received in the valleys, and a separation of these articles, each from the others; and
means establishing a separate discharge path at the lower end of the singulator, for articles which have moved down the singulator, by the back and forth movement of the movable slat members;
wherein the singulator also slopes transversely of the direction of movement of the movable slat members towards a lower side having a boundary wall.

22. A singulator according to claim 21, wherein the slat members at the lower side of the singulator are of a width smaller than the diameter of the smallest article to be delivered onto the singulator.

23. A singulator according to claim 22, wherein fixed and movable slat members positioned upwardly from the lower side of the singulator are thicker than the fixed and movable slat members at the lower side of the singulator.

* * * * *